(12) United States Patent
You et al.

(10) Patent No.: US 9,017,805 B2
(45) Date of Patent: Apr. 28, 2015

(54) POLYIMIDE-GRAPHENE COMPOSITE MATERIAL AND METHOD FOR PREPARING SAME

(71) Applicant: Korea Institute of Science and Technology, Seoul (KR)

(72) Inventors: Nam Ho You, Daejeon (KR); Ok-kyung Park, Jeollanam-do (KR); Bon-Cheol Ku, Daejeon (KR); Joong Hee Lee, Jeollabuk-do (KR); Munju Goh, Jeollabuk-do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/850,416

(22) Filed: Mar. 26, 2013

(65) Prior Publication Data

US 2014/0121350 A1     May 1, 2014

(30) Foreign Application Priority Data

Oct. 31, 2012 (KR) ........................ 10-2012-0121992

(51) Int. Cl.
| | | |
|---|---|---|
| C08L 33/20 | (2006.01) |
| C08L 77/00 | (2006.01) |
| C08L 79/00 | (2006.01) |
| C08L 87/00 | (2006.01) |
| C08G 73/10 | (2006.01) |
| C08L 79/08 | (2006.01) |
| C08G 83/00 | (2006.01) |
| C08K 3/34 | (2006.01) |

(Continued)

(52) U.S. Cl.
CPC .......... *C08G 73/105* (2013.01); *C08G 73/1071* (2013.01); *C08G 73/18* (2013.01); *C08G 73/22* (2013.01); *C08L 77/00* (2013.01); *C08L 79/04* (2013.01); *C08L 79/08* (2013.01); *C08G 83/001* (2013.01); *C08K 3/346* (2013.01); *C08K 7/24* (2013.01)

(58) Field of Classification Search
CPC .... C08J 2329/00; C08J 2333/12; C08K 3/04; C08K 9/08; C01B 31/04; C01B 31/0438; C01B 31/0446; C01B 2204/00; C09C 1/46
USPC ............ 428/221, 297.4, 297.7, 298.1, 298.7, 428/299.1, 300.1, 301.1, 407, 411.1, 473.5, 428/474.4, 477.7, 523, 688; 525/329.1, 525/418, 419, 420, 436; 528/422
See application file for complete search history.

(56) References Cited

FOREIGN PATENT DOCUMENTS

| | | |
|---|---|---|
| CN | 102592749 A | 7/2012 |
| KR | 1020120065734 A | 6/2012 |

OTHER PUBLICATIONS

Dan Chen, et al; "In Situ Thermal Preparation of Polyimide Nanocomposite Films Containing Functionalized Graphene Sheets", Applied Materials & Interfaces, vol. 2, No. 12, pp. 3702-3708; Published on Web: Nov. 10, 2010.

(Continued)

*Primary Examiner* — Ana Woodward
(74) *Attorney, Agent, or Firm* — Ladas & Parry LLP

(57) ABSTRACT

The present disclosure relates to a polyimide-graphene composite material and a method for preparing same. More particularly, it relates to a polyimide-graphene composite material prepared by adding modified graphene and a basic catalyst during polymerization of a polyimide precursor so as to improve mechanical strength and electrical conductivity and enable imidization at low temperature and a method for preparing same.

6 Claims, 4 Drawing Sheets

(51) Int. Cl.
*C08K 7/24* (2006.01)
*C08G 73/18* (2006.01)
*C08G 73/22* (2006.01)
*C08L 79/04* (2006.01)

(56) References Cited

OTHER PUBLICATIONS

Jen-Yu Wang, et al; "Preparation and properties of graphene oxide/polyimide composite films with low dielectric constant and ultrahigh strength via in situ Polymerization", Journal of Materials Chemistry, vol. 21, pp. 13569-13575; First published online Aug. 1, 2011.

Ting Huang, et al; "Chemically Modified Graphene/Polyimide Composite Films Based on Utilization of Covalent Bonding and Oriented Distribution", Applied Materials & Interfaces, vol. 4, pp. 2699-2708; Published Apr. 11, 2012.

Mitra Yoonessi, et al; "Graphene Polyimide Nanocomposites; Thermal, Mechanical, and High-Temperature Shape Memory Effects", American Chemical Society, vol. 6, No. 9, pp. 7644-7655, Published online Aug. 29, 2013.

Siu-Ming Yuen, et al; "Preparation, morphology and properties of acide and amine modified multiwalled carbon nanotube/polyimide composite", Composites Science and Technology, vol. 67, pp. 2564-2573, Available online Dec. 27, 2006.

David H. Wang, et al; "Nanocomposites Derived from a Low-Color Aromatic Polyimide (CP2) and Amine-Functionalized Vapor-Grown Carbon Nanofibers: In Situ Polymerization and Characterization", Macromolecules, vol. 40, pp. 6100-6111; Published on Web Jul. 26, 2007.

[Graphene]

Graphene

Graphene

POLYIMIDE-GRAPHENE COMPOSITE MATERIAL AND METHOD FOR PREPARING SAME

CROSS-REFERENCE TO RELATED APPLICATION

This application claims priority to Korean Patent Application No. 10-2012-121992, filed on Oct. 31, 2012, and all the benefits accruing therefrom under 35 U.S.C. §119, the contents of which in its entirety are herein incorporated by reference.

BACKGROUND

1. Field

The present disclosure relates to a polyimide-graphene composite material and a method for preparing same. More particularly, it relates to a polyimide-graphene composite material prepared by adding modified graphene and a basic catalyst during polymerization of a polyimide precursor so as to improve mechanical strength and electrical conductivity and enable imidization at low temperature and a method for preparing same.

2. Description of the Related Art

With industrial development and multifunctionalization of products, researches are actively carried out to maximize the intrinsic properties of materials and impart various functions to the materials by combining with other materials exhibiting different properties. In the field of composite materials, polymer composite materials are viewed as an effective solution to the multifunctionalization problem since they can be easily processed, are mass-producible and can have various properties depending on the materials combined together.

Among various resins, polyimide is used for the polymer composite materials or electronics products requiring high strength as a substrate material since it exhibits superior mechanical properties and is thermally stable.

Recently, researches are underway to improve mechanical strength of polyimide by filling a carbon-based filler having superior mechanical strength such as carbon nanotube or graphene in a polymer resin.

However, the polymer composite material with only the mechanical properties improved can be used in limited industrial applications and is inapplicable to high-tech industries such as the electronics industry due to the low electrical conductivity of the polymer resin. If the insulating polymer material is combined with a carbon-based filler exhibiting superior electrical conductivity and mechanical strength to impart electrical conductivity, the resulting polymer composite material will be applicable to the high-tech industries such as electric and electronics industries.

In this regard, Chinese Patent Publication No. 102592749 discloses introduction of functional groups to graphene oxide and preparation of a polyimide composite material using same. Since oxidized graphene is used, many defects remain on the graphene surface. And, since the process involves heat treatment at high temperatures above 300° C., the finally obtained composite material has reduced mechanical strength and the increase of electrical conductivity is only slight.

J. Mater. Chem. 2011, 21, 13569 discloses branching of the graphene oxide surface with oxydianiline and preparation of a polyimide composite material by in situ polymerization. Although mechanical properties are improved by this method, increase of electrical conductivity is slight.

The inventors of the present disclosure have made efforts to solve this problem and found that, by adding modified graphene and a basic catalyst during polymerization of a polyimide precursor, a polyimide-graphene composite material having improved mechanical strength and electrical conductivity may be prepared and imidization may be induced at low temperature.

REFERENCES OF THE RELATED ART

Patent Documents (Patent document 1) Chinese Patent Publication No. 102592749

Non-patent Documents (Non-patent document 1) *J. Mater. Chem.* (2011, 21, 13569)

(Non-patent document 2) *ACS Appl. Mater. Interfaces* (2010, 2, 3702)

(Non-patent document 3) *ACS Appl. Mater. Interfaces* (2012, 4, 2699)

SUMMARY

The present disclosure is directed to providing a polyimide-graphene composite material prepared by adding modified graphene and a basic catalyst during polymerization of a polyimide precursor so as to improve mechanical strength and electrical conductivity.

In one aspect, there is provided a method for preparing a polyimide-graphene composite material, including: modifying graphene by covalently bonding an amine-substituted aromatic or aliphatic compound on the surface of the graphene; performing polymerization by adding the modified graphene to a polyimide precursor; and heat-treating a polyimide precursor-graphene composite prepared from the polymerization to prepare a polyimide-graphene composite material.

In an exemplary embodiment, a basic catalyst may be added during the polymerization.

In an exemplary embodiment, the graphene may be graphene exfoliated from graphite without acid treatment or reduced graphene oxide obtained by heat-treating or chemically treating graphene oxide.

In an exemplary embodiment, during the modification or the polymerization, shear may be applied to the graphene along a circumferential direction using a homogenizer.

In an exemplary embodiment, the modified graphene may have the following structure:

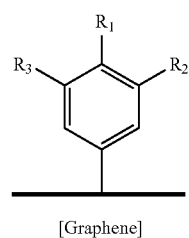

[Graphene]

In an exemplary embodiment, the modified graphene may have the following structure:

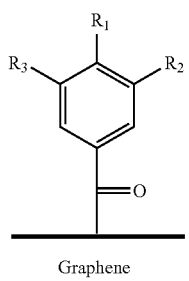

Graphene

In an exemplary embodiment, the modified graphene may have the following structure:

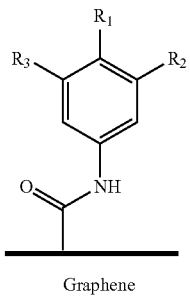

Graphene

In an exemplary embodiment, the heat treatment may be performed at 190-210° C.

In an exemplary embodiment, the amount of the modified graphene may be 0.1-30 wt % based on the weight of the polyimide precursor.

In another aspect, there is provided a polyimide-graphene composite material prepared by the method of the present disclosure.

In another aspect, there is provided a method for preparing a polyimide-carbon compound composite material, including: modifying a carbon compound by covalently bonding an amine-substituted aromatic or aliphatic compound on the surface of the carbon compound; performing polymerization by adding the modified carbon compound to a polyimide precursor; and heat-treating a polyimide precursor-carbon compound composite prepared from the polymerization to prepare a polyimide-carbon compound composite material, wherein the carbon compound is at least one selected from a group consisting of carbon nanotube and clay.

In another aspect, there is provided a method for preparing a polymer-graphene composite material, including: modifying graphene by covalently bonding an amine-substituted aromatic or aliphatic compound on the surface of the graphene; performing polymerization by adding the modified graphene to a polymer precursor; and heat-treating a polymer precursor-graphene composite prepared from the polymerization to prepare a polymer-graphene composite material, wherein the polymer precursor is at least one selected from a group consisting of polyacrylonitrile, polyamide, polybenzoxazole and polybenzimidazole.

The composite material prepared according to the method for preparing a polyimide-graphene composite material of the present disclosure has improved mechanical properties and electrical conductivity. In addition, since the method for preparing a polyimide-graphene composite material according to the present disclosure involves imidization at low temperature of 200° C. or lower, decrease in mechanical properties of the composite material occurring during heat treatment at high temperature of 300° C. or higher may be avoided.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
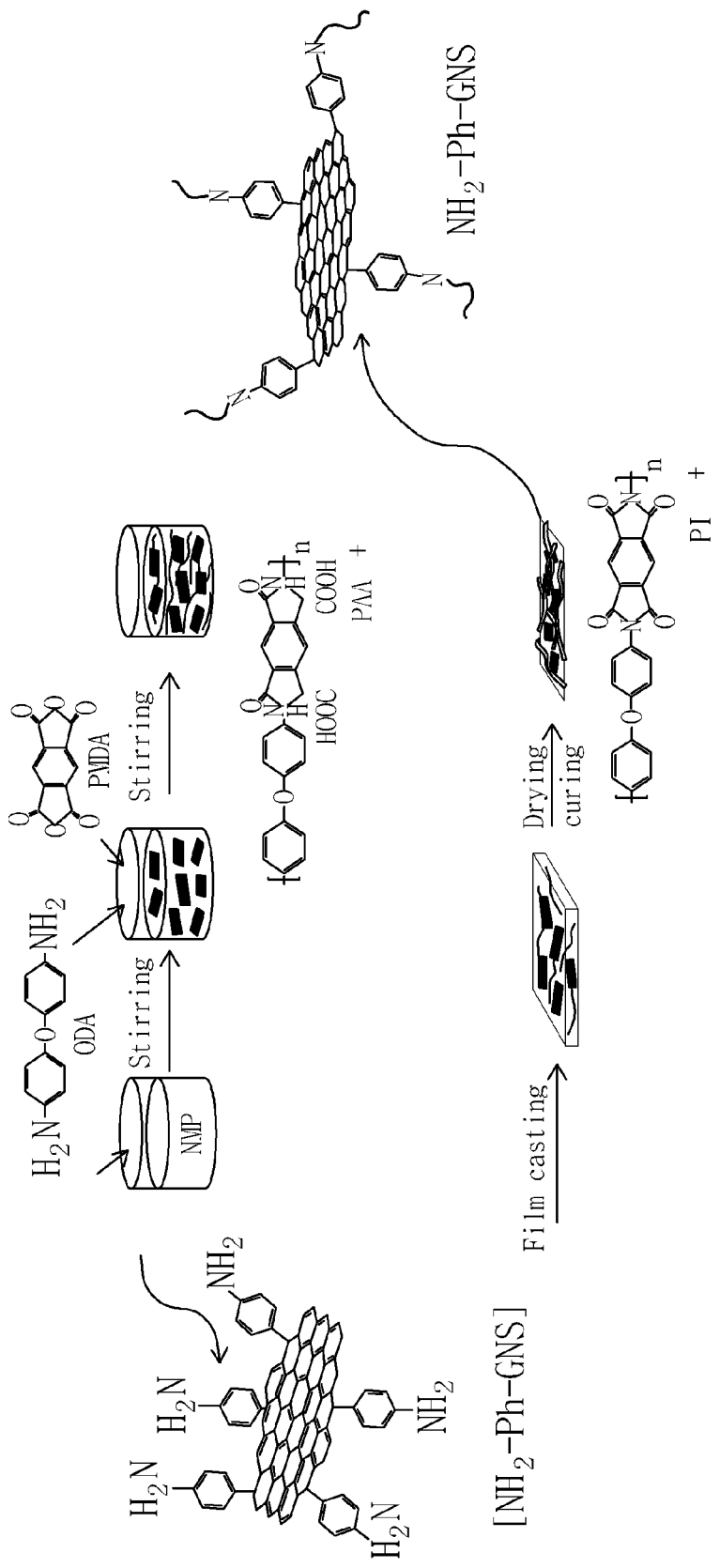
FIG. 1 describes a process of preparing a polyimide-graphene composite material according to an exemplary embodiment of the present disclosure.
Figure 2A:
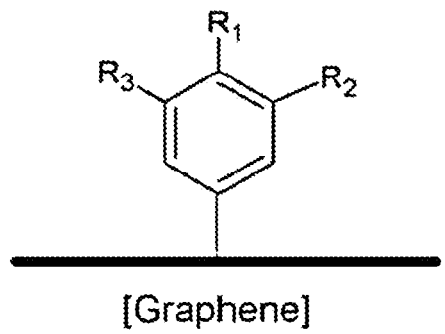
FIGS. 2a, 2b and 2c show amine-substituted graphenes according to exemplary embodiments of the present disclosure.
Figure 2B:
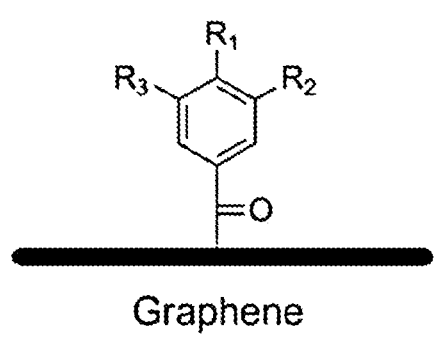
Figure 2C:
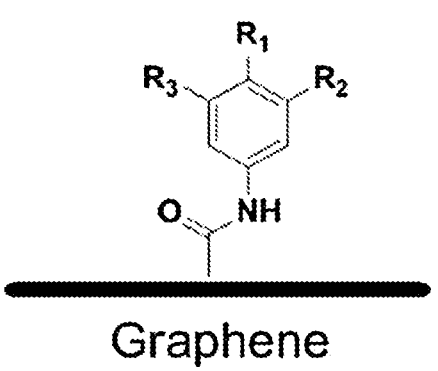
Figure 3:
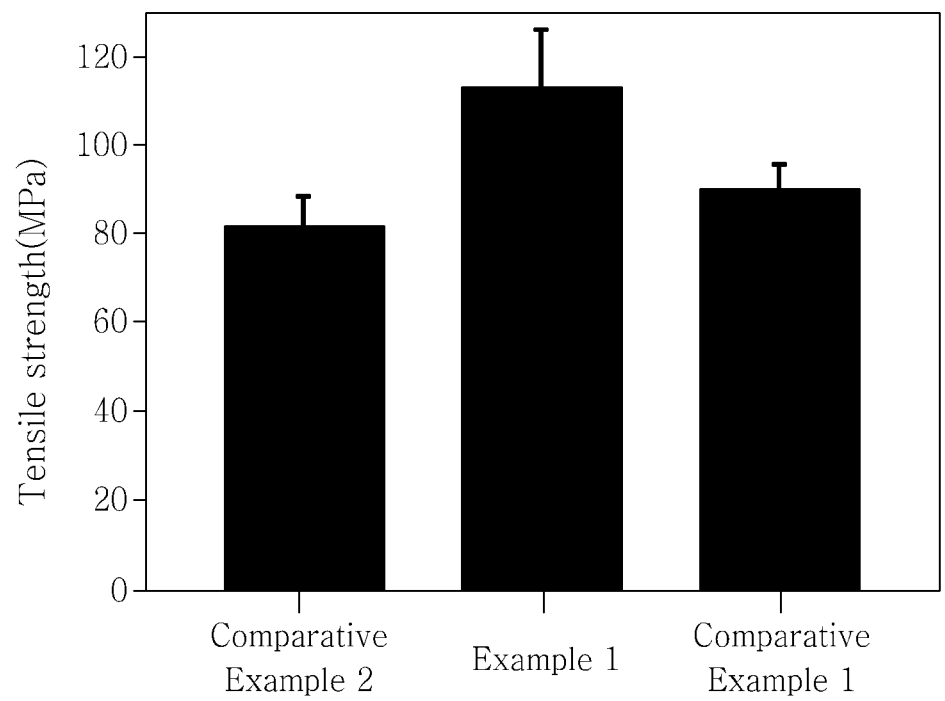
FIG. 3 shows tensile strength of a polyimide-graphene composite material according to an exemplary embodiment of the present disclosure depending on heat treatment temperature.
Figure 4:
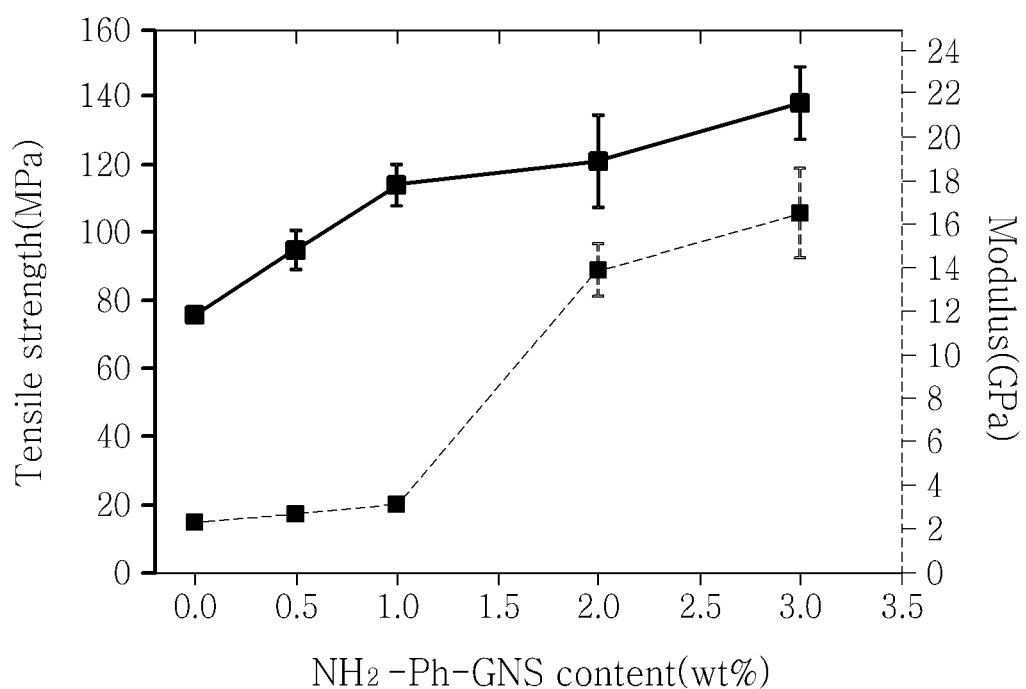
FIG. 4 shows tensile strength of a polyimide-graphene composite material according to an exemplary embodiment of the present disclosure depending on the weight of amine-substituted graphene based on the weight of polyimide.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

In the present disclosure, $R_1$, $R_2$ and $R_3$ represent amine group-containing compounds.

First, a method for preparing a polyimide-graphene composite material according to the present disclosure will be described.

A method for preparing a polyimide-graphene composite material according to an exemplary embodiment of the present disclosure includes: modifying graphene by covalently bonding an amine-substituted aromatic or aliphatic compound on the surface of the graphene; performing polymerization by adding the modified graphene to a polyimide precursor; and heat-treating a polyimide precursor-graphene composite prepared from the polymerization to prepare a polyimide-graphene composite material.

During the modification, the graphene is covalently bonded to the amine-substituted aromatic or aliphatic compound.

As an amine group-containing material, one whose amine group can react with an aromatic or aliphatic compound to substitute the aromatic or aliphatic compound with the amine group may be used without limitation. For example, 4-nitrobenzenediazonium tetrafluoroborate may be used.

The aromatic or aliphatic compound may be any one that can react with the amine group-containing material such that an amine group is introduced into the aromatic or aliphatic compound without limitation. For example, it may be a compound containing a benzene ring.

The graphene is a substance composed of carbon atoms arranged in a honeycomb-shaped hexagonal pattern with a 2-dimensional planar structure. It is not particularly limited as long as it can be covalently bonded to the amine-substituted aromatic or aliphatic compound, but it should not be an oxidized one. Oxidized graphene may have defects, e.g. —OH, —COON or epoxy group, on the graphene surface owing to oxidation, and, accordingly, even when it undergoes thermal imidization at 300° C. or higher, the finally prepared polyimide-graphene composite material may not have sufficiently improved electrical conductivity and mechanical strength since the imidization temperature is not enough high to reduce the graphene oxide. In completely reduced state, the $sp^3$-bonding of graphene can be changed to $sp^2$-bonding. The formation of $sp^2$-bonding allows free movement of π-electrons, resulting in increased electrical conductivity of the finally prepared composite material.

During the modification, the graphene is covalently bonded to the aromatic or aliphatic compound. The resulting modified graphene may have, for example, the following structures represented by Chemical Formula 1, 2 or 3.

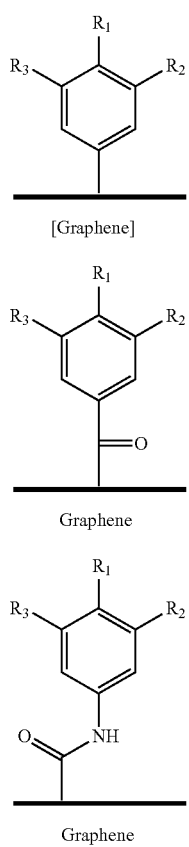

During the following polymerization, the modified graphene is added to the polyimide precursor.

The polyimide precursor is not particularly limited. For example, polyamic acid (PAA) may be used.

The amine-substituted aromatic or aliphatic compound is attached on the surface of the modified graphene and its amine group may participate in the polymerization of the polyimide precursor. Since the polymerization of the polyimide precursor is a reaction between amine acid anhydride, the amine group of the aromatic or aliphatic compound attached on the graphene surface can participate in the polymerization of the precursor. Through the reaction, the graphene forms a strong interfacial bonding with the polyimide precursor resin, resulting in enhanced mechanical strength of the finally prepared polyimide-graphene composite material.

During, a basic catalyst may be further added. The basic catalyst is not particularly limited as long as it enables imidization by the heat treatment following the polymerization at low temperature. For example, 1,4-diazabicyclo[2.2.2]octane, 2,3,4,6,7,8,9,10-octahydropyrimido[1,2-a]azepine, 4-hydroxypyridine, etc. may be used.

In the absence of the basic catalyst, high temperatures of 300° C. or higher is required for imidization and, under this condition, the covalent bonding between the graphene and the polyimide precursor is broken.

When the basic catalyst is added during the polymerization in accordance with the present disclosure, the imidization reaction can occur at about 200° C. and, thus, the problem of the breaking of the covalent bonding between the graphene and the polyimide precursor can be avoided.

When the graphene is bonded to the polyimide resin to form the polyimide composite material according to the present disclosure, it is necessary to form a conductive channel since the graphene is uniformly dispersed in the polyimide resin. The physical properties, particularly electrical conductivity, of the finally prepared composite material may be determined whether the graphene is uniformly dispersed. If ultrasonication employed as in the existing method, it is not easy to form a conductive channel in the polyimide resin since bonds are formed and then broken on the graphene surface and, as a result, a graphene with a small surface area is obtained.

However, in the present disclosure, bonding formation on the graphene surface can be minimized and a graphene sheet with a large surface area can be obtained by applying shear to the graphene along a circumferential direction using a homogenizer during the modification or polymerization. As a result, a conductive channel can be formed easily in the polymer resin, particularly in the polyimide resin.

During the following heat treatment, the prepared polyimide precursor-graphene composite is heat-treated to induce polyimidization, thereby preparing the polyimide-graphene composite material.

The heat treatment may be performed at 190-210° C. If the heat treatment is performed in this temperature range, imidization may be induced appropriately without breaking the covalent bonding between the modified graphene and the polyimide precursor.

The modified graphene may be included in an amount of 0.1-30 wt % based on the weight of the polyimide precursor. Particularly, mechanical properties, electrical conductivity and economy of the polyimide-graphene composite material are optimized when the graphene is included in an amount of 0.5-5 wt % based on the weight of the polyimide resin.

In another embodiment of the present disclosure, a carbon compound may be used instead of the graphene. In this case, the carbon compound may be at least one selected from a group consisting of carbon nanotube and clay and a polyimide-carbon compound composite material with improved mechanical properties and electrical conductivity may be prepared.

In another embodiment of the present disclosure, a polymer precursor may be used instead of the polyimide precursor. In this case, the polymer precursor may be at least one selected from a group consisting of polyacrylonitrile, polyamide, polybenzoxazole and polybenzimidazole and a polymer-graphene composite material with improved mechanical properties and electrical conductivity may be prepared.

EXAMPLES

Hereinafter, the present disclosure will be described in detail through examples. However, the following examples are for illustrative purposes only and it will be apparent to those of ordinary skill in the art that the scope of the present disclosure is not limited by the examples.

Example 1

0.5 g of graphene (CM-250, XG-Science, USA) heat-treated at 1500° C. for 1 hour was added to 100 mL of a sulfuric acid solution. After ultrasonic dispersion for 30 minutes, the dispersed graphene solution was added to a reactor and the temperature of the reactor was set to 60° C.

When the temperature of the reactor reached 60° C., 1.5 g of 4-nitrobenzenediazonium tetrafluoroborate was added and the solution was stirred at 60° C. for 1 hour.

After the stirring, the mixture was cooled to room temperature and washed with DMF to remove unreacted substances. After finally washing with ethanol to remove the remaining DMF, the resultant was dried in a vacuum oven at 60° C. to obtain graphene with an amino group-containing aromatic compound attached thereto.

In order to change the amino group of the amino-functionalized graphene to an amine group, the amino-functionalized graphene was added to a solution of 45 g of phosphoric acid in 50 mL of distilled water and stirred at 115° C. for 6 hours.

After the stirring, the mixture was cooled to room temperature and, after slowly adding 200 mL of ammonium hydroxide, 100 mL of methanol was added.

Upon completion of reaction, the product was diluted with distilled water and stirred. After removing the produced salt and washing finally with ethanol, the product was dried in a vacuum oven at 60° C. to obtain modified graphene in which the amine group-containing carbon compound was covalently bonded to graphene. The prepared modified graphene was $NH_2$-Ph-GNS.

8 g of the modified graphene was added to 1-methyl-2-pyrrolidone (NMP) and dispersed for 1 hour using a homogenizer to prepare a solution in which graphene is dispersed. After adding 1 wt % of DABCO™, (the corresponding IUPAC chemical name for the product known as DABCO™ is 1,4-diazabicyclo[2.2.2]octane which is trademarked by AirProducts) based on the weight of a polyamide precursor PAA to the graphene solution, the mixture was stirred for 10 minutes. After the stirring, 1 g of 4,4'-oxydianiline was added and the mixture was stirred to dissolve the monomer. After the 4,4'-oxydianiline was dissolved, 1.08 g of pyromellitic dianhydride was added and the mixture was stirred for 24 hours to obtain a polyamic acid precursor filled with the amine-functionalized graphene. The polyamic acid precursor with the modified graphene was heat-treated at 80° C. for 1 hour to remove the remaining solvent and gradually heated to 200° C. and imidized for 30 minutes to prepare a polyimide composite material filled with the modified graphene.

Comparative Example 1

A polyimide composite material filled with modified graphene was prepared under the same condition as Example 1, except that imidization was performed at 300° C. for 1 hour.

Comparative Example 2

To prepare pure polyimide, 4,4'-oxydianiline was dissolved in NMP by stirring. After adding 1 wt % of DABCO based on the weight of the oxydianiline and pyromellitic dianhydride to the solution, the mixture was stirred for 10 minutes. After the stirring, 1.08 g of pyromellitic dianhydride was added and the mixture was stirred for 24 hours to obtain polyamic acid. The prepared polyamic acid precursor was heat-treated at 100° C. for 1 hour to remove the remaining solvent and gradually heated to 200° C. and imidized for 30 minutes to prepare polyimide.

Test Example 1

In order to investigate the effect of imidization temperature on mechanical properties, tensile strength and elastic modulus of the polyimide composite materials prepared in Example 1 and Comparative Examples 1-2 were measured using a universal testing machine (UTM, 5567A, Instron, USA). The result is shown in Table 1.

TABLE 1

| Sample | | Heat-treatment condition | Tensile strength (MPa) | Elastic modulus (GPa) |
|---|---|---|---|---|
| Example 1 | $NH_2$—Ph-GNS/PI | 200° C., 30 minutes | 114 ± 6.1 | 3.1 ± 0.30 |
| Comparative Example 1 | $NH_2$—Ph-GNS/PI | 300° C., 1 hour | 89.5 ± 5.8 | 3.0 ± 0.35 |
| Comparative Example 2 | Pure PI | 200° C., 30 minutes | 75.7 ± 3.1 | 2.3 ± 0.15 |

It can be seen that the polyimide-graphene composite material prepared according to the present disclosure exhibits significantly improved mechanical properties as compared to pure polyimide.

The polyimide-graphene composite material prepared according to the present disclosure has enhanced tensile strength and elastic modulus since imidization occurs at 200° C. and thus breaking of the interfacial bonding between the graphene and the polyimide is prevented.

Test Example 2

In order to investigate the effect of the content of modified graphene on the mechanical properties of the polyimide-graphene composite material, tensile strength and elastic modulus of the polyimide composite materials prepared in Examples 2-5 and Comparative Example 2 were measured using a universal testing machine (UTM, 5567A, Instron, USA). The result is shown in Table 2.

TABLE 2

| Sample | | Graphene content (wt %) | Tensile strength (MPa) | Elastic modulus (GPa) |
|---|---|---|---|---|
| Example 2 | $NH_2$—Ph-GNS/PI | 0.5 | 95 ± 5.2 | 2.7 ± 0.21 |
| Example 3 | $NH_2$—Ph-GNS/PI | 1 | 114 ± 6.1 | 3.1 ± 0.3 |
| Example 4 | $NH_2$—Ph-GNS/PI | 2 | 121 ± 13.4 | 13.9 ± 1.2 |
| Example 5 | $NH_2$—Ph-GNS/PI | 3 | 138 ± 10.6 | 16.5 ± 2.1 |
| Comparative Example 2 | Pure PI | — | 75.7 ± 3.1 | 2.3 ± 0.15 |

As seen from Table 2, the polyimide-graphene composite materials prepared according to the present disclosure showed remarkably improved mechanical properties as the content of graphene increased.

In particular, the polyimide-graphene composite material containing 3 wt % of graphene showed about 1.8 times improved tensile strength and about 7 times improved elastic modulus as compared to pure polyimide.

Test Example 3

In order to investigate the effect of the content of modified graphene on the electrical conductivity of the polyimide-graphene composite material, electrical conductivity of the polyimide composite materials prepared in Examples 3, 5 and 6, and Comparative Example 2 was measured using the 4-point probe method. The result is shown in Table 3.

TABLE 3

| Sample | | Graphene content (wt %) | Electrical conductivity (S/cm) |
| --- | --- | --- | --- |
| Example 3 | NH$_2$—Ph-GNS/PI | 1 | $8.6 \times 10^{-8}$ |
| Example 5 | NH$_2$—Ph-GNS/PI | 3 | $6.6 \times 10^{-4}$ |
| Example 6 | NH$_2$—Ph-GNS/PI | 5 | $1.2 \times 10^{-3}$ |
| Comparative Example 2 | Pure PI | — | $1.2 \times 10^{-15}$ |

As seen from Table 3, the polyimide-graphene composite materials prepared according to the present disclosure showed remarkably improved electrical conductivity as the content of graphene increased.

In particular, the polyimide-graphene composite material containing 5 wt % of graphene showed about much higher electrical conductivity ($1.2 \times 10^{-3}$ S/cm) as compared to pure polyimide.

While the exemplary embodiments have been shown and described, it will be understood by those skilled in the art that various changes in form and details may be made thereto without departing from the spirit and scope of the present disclosure as defined by the appended claims.

What is claimed is:

1. A method for preparing a polymer-graphene composite material, comprising:

modifying by covalently bonding an amine-substituted aromatic compound on a surface of the graphene so as to produce any one of the following structures wherein each of R1 to R3 is an amino group:

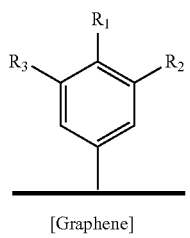

[Graphene]

(1)

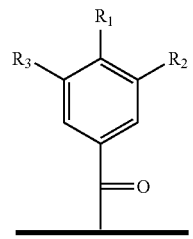

Graphene (2)

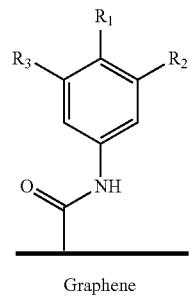

Graphene (3)

adding a polymer precursor to the modified graphene to react with the modified graphene to produce a polymer precursor-graphene composite; and heat-treating to polymerize the polymer precursor-graphene composite to prepare a polymer-graphene composite material, wherein the polymer precursor is a precursor that forms at least one selected from the group consisting of polyacrylonitrile, polyamide, polybenzoxazole and polybenzimidazole.

2. The method for preparing a polymer-graphene composite material according to claim 1, which further comprises adding a basic catalyst during the polymerization.

3. The method for preparing a polymer-graphene composite material according to claim 1, wherein the graphene is graphene exfoliated from graphite without acid treatment or reduced graphene oxide obtained by heat-treating or chemically treating graphene oxide.

4. The method for preparing a polymer-graphene composite material according to claim 1, wherein, during the modification or the polymerization, shear is applied to the graphene along a circumferential direction using a homogenizer.

5. The method for preparing a polymer-graphene composite material according to claim 1, wherein the heat treatment is performed at 190-210° C.

6. The method for preparing a polymer-graphene composite material according to claim 1, wherein the amount of the modified graphene is 0.1-30 wt % based on the weight of the polymer precursor.

* * * * *